United States Patent [19]

Therrien et al.

[11] Patent Number: 5,288,209
[45] Date of Patent: Feb. 22, 1994

[54] AUTOMATIC ADAPTIVE SCULPTURED MACHINING

[75] Inventors: Roger J. Therrien, Georgetown, Mass.; Randall M. Ouellette, Proctor, Utah

[73] Assignee: General Electric Company, Cincinnati, Ohio

[21] Appl. No.: 810,943

[22] Filed: Dec. 19, 1991

[51] Int. Cl.⁵ .................... F01D 5/22; G01B 5/20
[52] U.S. Cl. .................... 416/193 R; 416/196 R; 364/474.15; 364/474.35; 318/568.1
[58] Field of Search .............. 416/193 R, 196 R; 364/474.15, 474.35; 318/569, 594, 567, 568.1, 600, 601

[56] References Cited

U.S. PATENT DOCUMENTS

| | | |
|---|---|---|
| 3,918,348 | 11/1975 | Runft . |
| 4,131,837 | 12/1978 | Whetham . |
| 4,370,721 | 1/1983 | Berenberg et al. . |
| 4,382,215 | 5/1983 | Barlow et al. . |
| 4,786,219 | 11/1988 | Oberlin et al. . |
| 4,995,087 | 2/1991 | Rathi . |
| 5,047,966 | 9/1991 | Crow et al. . |
| 5,055,752 | 10/1991 | Leistensnider et al. . |

Primary Examiner—Edward K. Look
Assistant Examiner—James A. Larson
Attorney, Agent, or Firm—Jerome C. Squillaro; Charles L. Moore, Jr.

[57] ABSTRACT

An improved method of adaptive machining is disclosed which affords automatic blending between a machined surface and a complex variable contour forged surface. An adaptive postprocessor generates an adaptive NC part program from a conventional APT file which has the capability to modify the cutter tool path in real time during the machining cycle based on limited surface measurement data. Variable measurement data taken from each workpiece generates a unique toolpath adapted specifically to the contour of that workpiece being processed, obviating the subsequent need for time consuming manual grinding and smoothing operations between machined and forged surfaces.

14 Claims, 4 Drawing Sheets

AUTOMATIC ADAPTIVE SCULPTURED MACHINING

TECHNICAL FIELD

The present invention relates generally to automated machining and more specifically to an improved method of controlling machining to automatically blend a complex contoured machined surface with a variable complex contoured forged surface.

BACKGROUND INFORMATION

The manufacture of gas turbine engine airfoil members, such as fan and axial compressor blades, typically entails alternately heating and forging metallic billets through a series of progressive dies until the airfoil meets the engineering design requirements as to surface contour, thickness, twist, etc. An engineering master drawing typically defines the airfoil contour requirements at a plurality of radially spaced longitudinal slices or sections through the airfoil. To be acceptable, the actual airfoil surface must fall between maximum and minimum contours at each radial location. Further the airfoil surfaces must smoothly transition from each section to the next. Due to the inherent complexity of the airfoil contour as well as the variability in the forging process, reasonable tolerances are applied. After the airfoil has been formed, subsequent machining steps are required to remove excess material and extruded flash from the leading and trailing edges, and correctly machine attachment areas such as dovetails. The smooth blending of the surface contours from forged to machined areas is critical to meeting the design requirements. Any steps or other surface irregularities give rise to undesirable stress concentrations in the airfoil which limit blade life. Further, these discontinuities adversely affect the airflow over the blades causing localized turbulence and a consequent reduction in pumping efficiency.

Fan and compressor systems for large turbofan engines often incorporate midspan shrouds. These aerodynamically shaped shrouds extend generally circumferentially from both the pressure and suction faces of each airfoil and abut adjacent shrouds, serving to stabilize the airfoil members thereby preventing excessive detrimental vibratory response during engine operation. Due to the complexity of the airfoil configuration and difficulty in forging the shrouds to correct size and precise location, excess material is incorporated to form oversized protrusions from which the desired shroud contour is machined. Conventionally, the majority of the excess material is removed from the protrusion by a numerically controlled (NC) milling machine using the previously machined dovetail as a reference datum. Since the as-forged airfoil surface is complexly contoured and has a relatively large dimensional tolerance, a standoff dimension, for example 0.050 inch, is incorporated in the NC part program which prevents the milling cutter from disturbing the excess material proximate the dimensionally acceptable airfoil surface. This remaining material must be subsequently removed via tedious, time and labor intensive manual benching or grinding to smoothly blend the two areas. This results in blades which are costly to produce and which lack consistent dimensional uniformity in the blend area, where additional requirements exist as to fillet radius to maintain low stress.

A known method of accommodating the automatic machining of parts having variable geometry on NC machines utilizes a mechanical probe to measure the location of surface features prior to machining. An example of such a method is described in U.S. Pat. No. 4,382,215 System and Method of Precision Machining issued to Barlow et al and assigned to the same assignee as the present invention. Such methods, however, are limited to shifting or translating an NC part program in total along one of the X, Y or Z axes of the machine tool, depending on the offset from nominal calculated from the probe hit data. While effective for machining a uniform surface such as an outer diameter of a cylindrical component, such a technique would not be of benefit in the blending requirement at issue due to the continuously contoured airfoil surface. Total deviation from nominal of the part surface for a conventional blade having a radial airfoil length of approximately eight inches and a nominal chord length of two inches due to contour, thickness and twist in the worst case stackup can easily exceed 0.030 inch. For a smooth blend requirement of $\pm 0.0015$ inch, it is clear that offsetting the NC program, which is drawn to the nominal airfoil surface would be insufficient. Allowable contour variation alone at a given section can exceed 0.010 inch. Similarly, attempts to skew the toolpath by the offset, for example from a maximum value at the leading edge to zero at the trailing edge, or by adding half the offset at the leading edge and subtracting half at the trailing edge do not meet the requirement, as ultimately, they rely on simply rotating the nominal tool path and do not match the actual airfoil contour.

To properly blend the shroud to the airfoil, the airfoil surface proximate the area to be machined should be measured and the appropriate NC part program generated to match the specific contour of each airfoil. Initial attempts applied to machining airfoil squealer tips utilize fixed gaging, specific to each blade design, to measure individual blades. Measurement data is uploaded to a computer aided design (CAD) system on a host computer where the part surface is regenerated and a unique tool path NC part program is defined for each blade. The unique program is then downloaded and the part is machined. While achieving acceptable final results, this technique utilizes costly fixed gaging, entails two way communication between the host and machine tool computers and requires up to four hours of host computing time to regenerate the surface and the unique tool path part program to machine that single blade only. Application of this technique to the more complex contoured airfoil surface problem at hand in a high volume production environment is clearly unacceptable.

OBJECT OF THE INVENTION

Accordingly, the object of the present invention is to provide a method of adaptive machining whereby the tool path in the NC part program is automatically modified in real time in the machine tool control during machining to efficiently blend a machined portion of a workpiece with a variable forged portion thereby essentially obviating the need for any post machining manual processing of the workpiece.

SUMMARY OF THE INVENTION

A workpiece comprising an area to be machined which must be blended with an adjacent variably contoured forged surface is conventionally fixtured in an NC machine tool. The adaptive NC part program includes an automatic probing routine which measures the forged surface in a plurality of locations proximate the area to be machined. The calculated deviation from nominal part location at each probing point is stored in the machine tool controller. During execution of the machining sequence, the variable probe data is incorporated in linear interpolative fashion in the part program which modifies the tool path while machining. A single NC part program can therefore be utilized to adaptively machine a plurality of common blades of varying initial contour in a highly efficient manner without the need for communication between the machine tool controller and a host computer.

BRIEF DESCRIPTION OF DRAWINGS

The novel features believed characteristic of the invention are set forth and differentiated in the appended claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
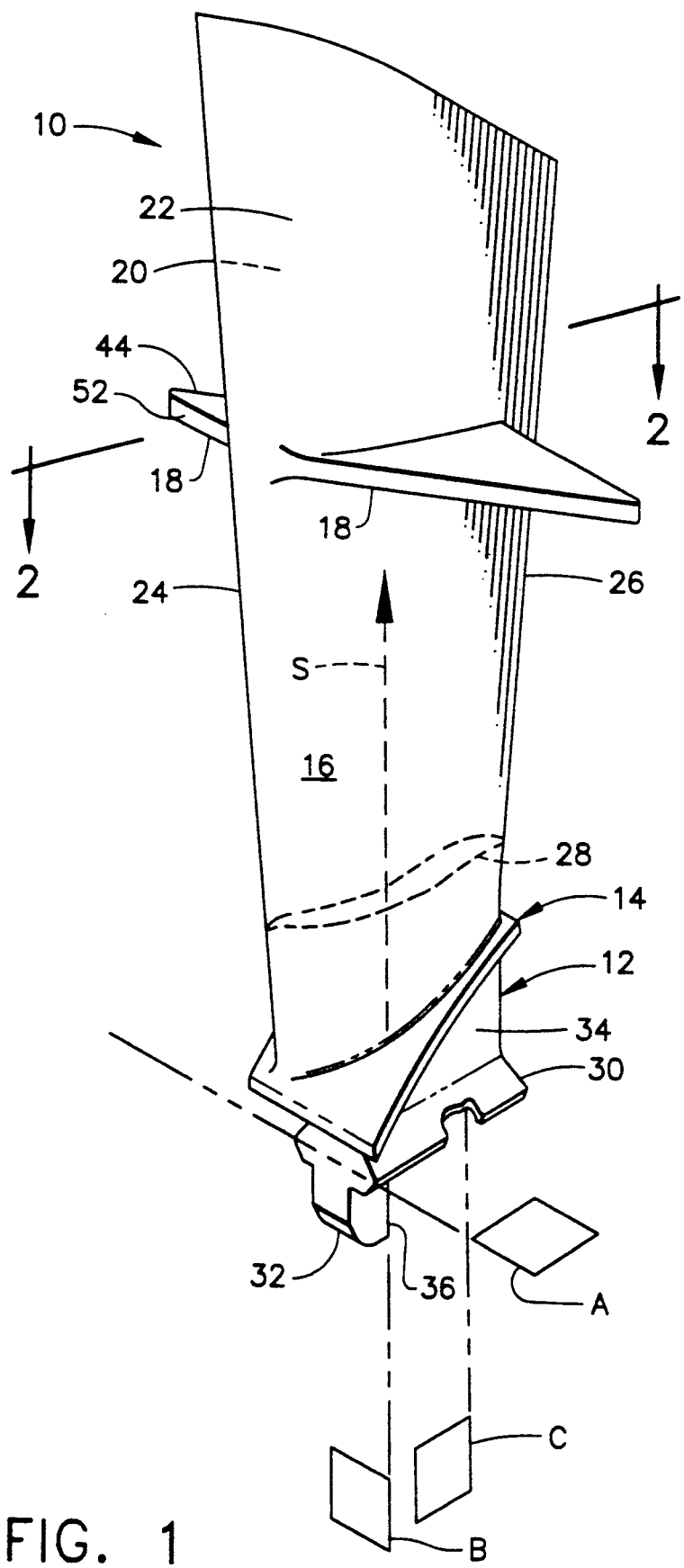
FIG. 1 is a schematic, perspective view of a compressor blade incorporating midspan shrouds.

Shown in FIG. 1 is a conventional compressor blade 10 comprised of a root 12, platform 14 and airfoil 16. The blade 10 extends in a generally radial direction relative to a gas turbine axis of rotation when installed in an axial flow compressor. Blade 10 is further characterized by midspan shrouds 18 extending from the pressure and suction faces, 20 and 22 respectively, of airfoil 16. Faces 20 and 22 are joined at leading edge 24 and trailing edge 26. The proper contour of airfoil 16 is defined at a plurality of longitudinal sections 28 as heretofore mentioned. Each section 28 is related geometrically within its plane to a point known as the stacking point. The stacking points of the plurality of sections 28 define the stacking axis, shown generally at S. Stacking axis S is used to define the twist angle between radially spaced sections 28. The location and orientation of each section 28 is further defined by three planar datums A, B, and C of root 12, thereby fully geometrically defining airfoil 16. Primary datum A passes longitudinally through dovetail 30 of root 12 and is used to establish radial location. Secondary datum B coincides with the aft planar face 36 of chamfered tang 32 and is used to establish longitudinal location from a point on the engine axis. Lastly, tertiary datum C coincides with radial wall 34 of root 12 (shown through broken away section of dovetail 30 for clarity) and is used to establish circumferential location about a circle centered at the engine axis. By accurately measuring from planar datums A, B, and C, the acceptability of the contour of airfoil 16 and the accurate siting of the machined midspan shrouds 18 and other features can be verified. Note that the directional terms radial, circumferential and longitudinal are being used consistent with common usage of a blade in the installed condition in a conventional gas turbine engine compressor having a generally longitudinally slotted disk.

Figure 2:
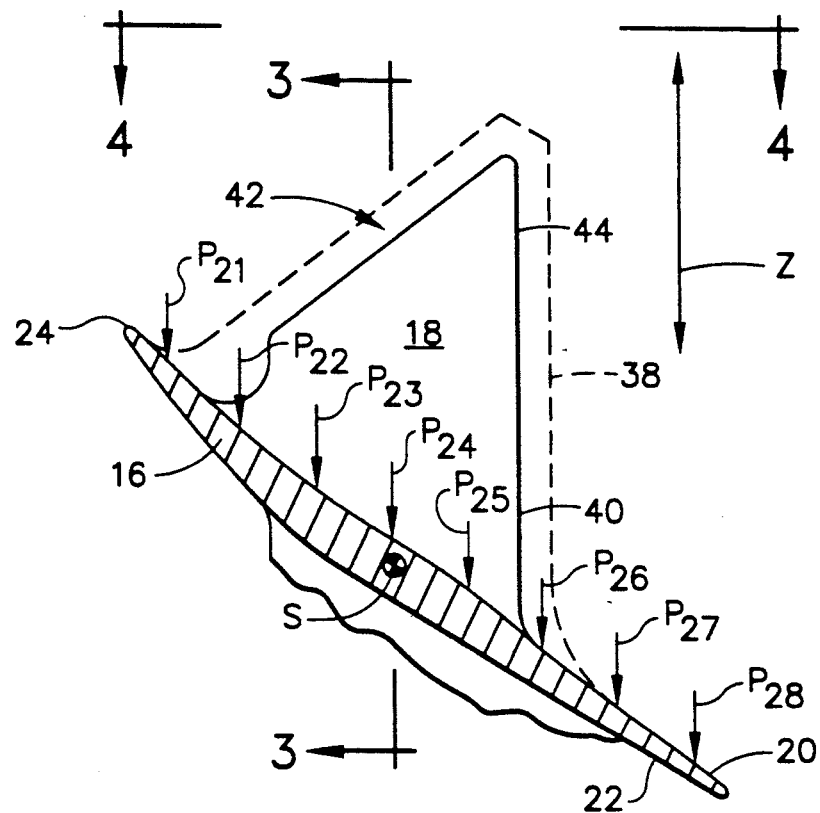
FIG. 2 is an enlarged, transverse, partly sectional rotated view of the blade illustrated in FIG. 1 taken along line 2—2.

Once the root 12 has been conventionally machined, thereby establishing datums A, B, and C, machining of the shrouds 18 and other features can proceed on an NC machine tool, since the blade can be reliably and repeatably positioned in a holding fixture in a known location and orientation. Referring now to FIG. 2, shown in section is airfoil 16 with shroud 18 protruding from pressure face 20. No distinction is being made between the shrouds 18 on the pressure face 20 and suction face 22, since for the purposes of this disclosure the adaptive machining process is similar. The forge envelope 38, shown in phantom, is sized to ensure that the forging process is capable of repeatably producing a sufficient volume of material to fully encase the machined shroud contour 40. As seen in this view, excess material 42 must be removed from the envelope 38 over a significant portion of the airfoil surface.

Figure 3:
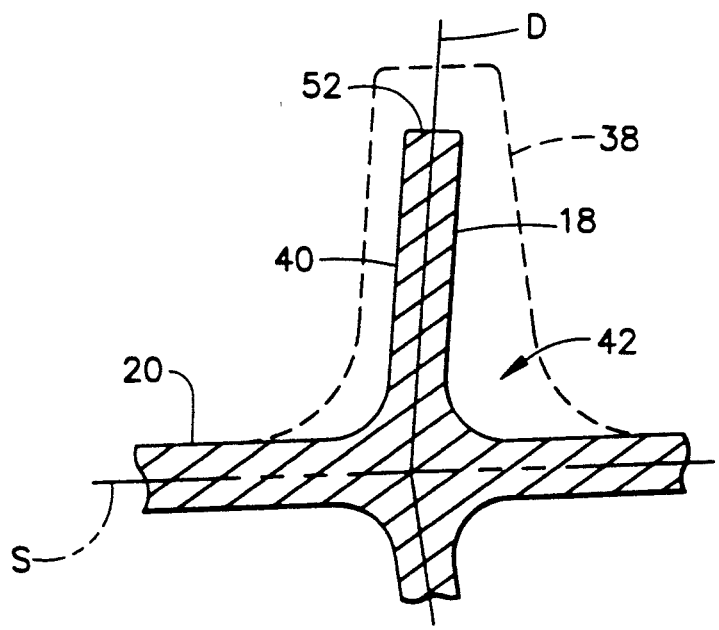
FIG. 3 is a longitudinal sectional view of the blade portion shown in FIG. 2 taken along line 3—3.

FIG. 3 further shows the extent of the forge envelope 38 from another view taken through the stacking axis S of FIG. 2 along line 3—3. In this view, axis D of shroud 18 is shown to be slightly canted radially inwardly with respect to stacking axis S. This is done so that shroud contact face 52 of shroud 18 will abut properly with the suction face shroud of the adjacent blade (not shown). Since the forging process requires symmetry in such forged protrusions as well as a minimum draft angle to facilitate workpiece release from the dies, a relatively large volume of excess metal, shown generally at 42, must be provided and subsequently machined away so that shroud contour 40 properly blends with the contour of pressure face 20.

Figure 4:
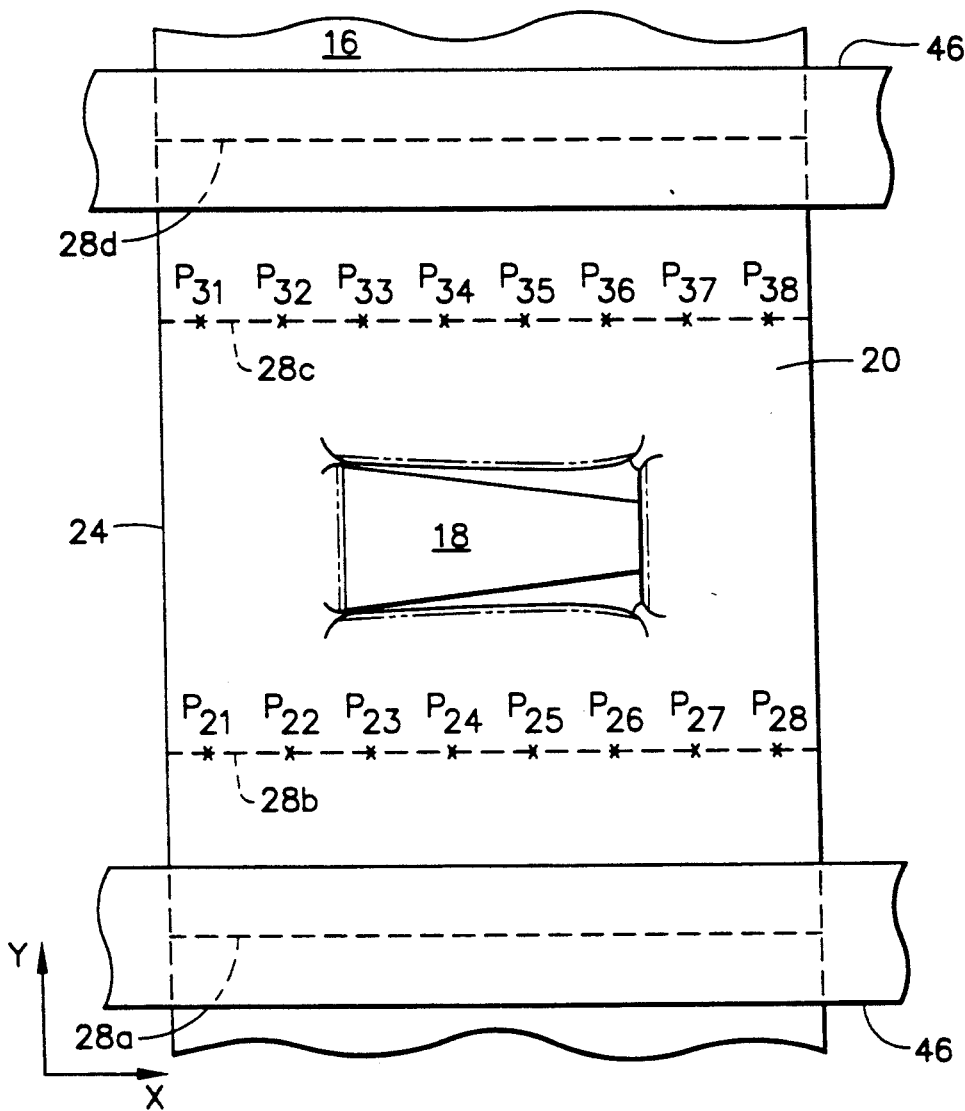
FIG. 4 is a schematic plan view of the portion of the blade shown in FIG. 2 taken along line 4—4 showing the probing locations.

In the preferred embodiment for machining shroud 18 on pressure face 20, blade 10 is conventionally fixtured on the table of an NC vertical machining center (VMC) by sliding root 12 into a mating fixture slot (not shown) thereby establishing datums A, B and C relative to the fixture and the VMC's geometric coordinate reference system. Shroud 18 is oriented such that the aft facing airstream edge 44, as shown in FIGS. 1 and 2, and shroud axis D, as shown in FIG. 3, are vertical or parallel with the spindle or Z axis of the VMC. This requires that airfoil 16 be held in a canted orientation. FIG. 4 shows a plan view of the section of the airfoil 16 of interest. Once loaded into the fixture, clamps 46 are hydraulically actuated to firmly retain the airfoil 16 in a fixed position during probing and machining. These clamps 46 are located proximate the area to be machined and support airfoil 16 at longitudinal sections 28a and 28d. Probing is conducted along longitudinal sections 28b and 28c which bound the area to be machined. Sections 28a, 28b, 28c, and 28d coincide with sections defined on the master engineering drawing and are therefore of known nominal geometry. In the preferred embodiment, using a touch trigger probe with a spherical tip stylus, the deviation from nominal of airfoil pressure face 20 in the Z axis direction is measured at eight equally spaced locations along section 28b, at $P_{21}$ through $P_{28}$, and similarly along section 28c, at $P_{31}$ through $P_{38}$. The calculated deviations at these locations, $D_{21}$ through $D_{28}$ and $D_{31}$ through $D_{38}$, respectively, are stored in the machine tool controller and used to modify the cutter toolpath during the machining cycle. Conventional probe ball tangency error corrections are included in the deviation calculation as the probe tip is measuring the Z axis location of a canted surface.

In development of a conventional NC part program, information from the Computer Aided Design (CAD) file, which defines the geometry of the nominal blade 10, is used to generate a generic Automatically Programmed Tools (APT) manufacturing application computer program. The APT program is then manipulated by a postprocessor which transforms the code into an NC part program adapted for use with a specific machine tool and machine tool controller combination. For example, under the direction of the NC program during the machining sequence on a Monarch Model 45 VMC fitted with a GE MC2000 control, the program may automatically direct the loading of a tool from the magazine into the spindle, rapid traverse the X and Y table axes to position the workpiece under the spindle, start the spindle, turn on the coolant and proceed to machine the workpiece by coordinating the movement of the X, Y and Z axes. For contouring, where all axes are typically moving simultaneously, each move command may contain new positions for all three axes, corresponding to a new point in the machine tool coordinate system. All moves are therefore small discrete straight line moves. Three typical sequential lines of code defining move commands are as follows:

N1020 X.6699 Y4.6552 Z.0227
N1030 X.6659 Y4.6319 Z.0235
N1040 X.6614 Y4.6055 Z.0240 where the first term is the line reference number in the code followed by the coordinate positions along the respective axes in the machine tool coordinate system. According to the teachings of this invention, a specialized adaptive machining postprocessor is used to manipulate the APT program to output code which utilizes the probe data to modify the Z axis position automatically during execution of the machining cycle. The input therefore to the adaptive machining postprocessor must include not only the standard APT machining program code, but also a file containing the nominal X, Y and Z coordinates of the probing locations.

The adaptive machining postprocessor performs two novel functions on the APT code. Firstly, based on the input file containing the nominal probing hit coordinates, it creates a machine measurement routine. During execution of the adaptive NC part program, prior to machining, the touch trigger probe is inserted into the spindle and the pressure face 20 is probed at $P_{21}$ through $P_{28}$ and $P_{31}$ through $P_{38}$. The Z axis deviations from nominal for each of the locations, $D_{21}$ through $D_{28}$ and $D_{31}$ through $D_{38}$, respectively, are calculated and written to a parameter file in the MC2000 and stored there until needed. Secondly, in the generation of the adaptive NC program, the adaptive postprocessor reads the APT program to determine the spatial or XYZ location of the tool for each move command; determines the spatial destination of each move relative to a plurality of proximate Z axis deviation points measured by the probe; using an algorithm, defines a unique Z axis offset equation which is a function of the proximate Z axis deviation points; inserts a line in the NC program introducing this offset equation; and modifies the XYZ move command to utilize this offset. This is repeated for all move commands in the program. In this manner, the entire area to be machined is mapped with Z axis offsets from nominal based on the particular deviations of a given workpiece.

Figure 5:
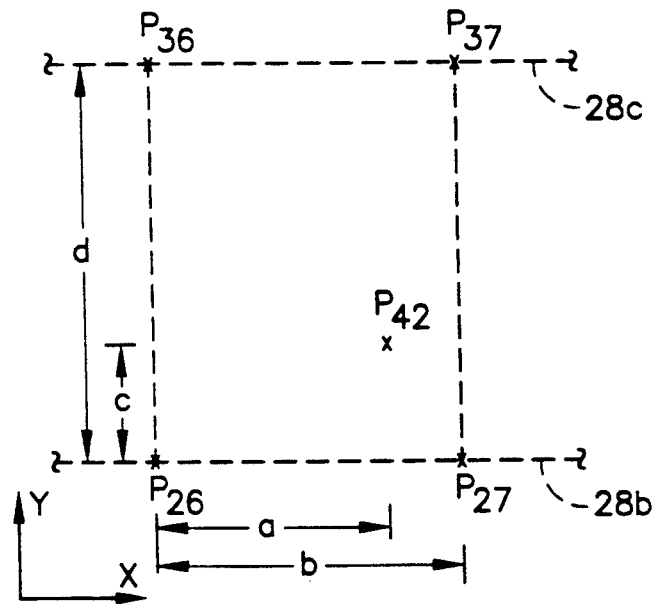
FIG. 5 is a schematic representation of the geometric relationship underlying one form of linear interpolation algorithm.

By way of example, a preferred algorithm for machining the midspan shroud 18 utilizes a two level dual axis linear interpolation. The probed region is divided into a series of rectangles using the probe points as corners. The proximity of the point of interest for a given move command to the four probe points defining the boundary of the rectangle in which the point of interest is located determines the weighting afforded each deviation. FIG. 5 depicts one such rectangle bounded by probe points $P_{26}$, $P_{27}$, $P_{36}$ and $P_{37}$. In order to determine the value of deviation $D_{42}$ at point of interest $P_{42}$, the adaptive postprocessor first selects $P_{26}$ as the origin. $P_{42}$ is located a distance "a" from the origin along the X axis and a distance "c" from the origin along the Y axis. The total distance between probe points along the X and Y axes are "b" and "d" respectively. Linearly interpolating the values of the deviations along the X and Y axes results in the following mathematical equation:

$$D_{42} = \frac{(b-a)(d-c)}{bd} D_{26} + \frac{a(d-c)}{bd} D_{27} + \frac{c(b-a)}{bd} D_{36} + \frac{ac}{bd} D_{37} \quad (1)$$

By this method, for all move command lines in the APT program, the adaptive postprocessor calculates the unique weighting factors based on the values of a, b, c and d for that location. In this manner, the entire area bounded by the four deviations can be mapped, with the deviation values remaining as variables. Based solely on the location of the point of interest within the rectangle, a line can be written to the NC part program which accords the proper weighting to each deviation, regardless of its value. In the previous example, the adaptively postprocessed NC part program would be written as follows:

N1015  $D_{42}=D_{26}*0.002+D_{27}*0.357+D_{36}*0.003+D_{37}*0.639$
N1020 X.6699 Y4.6552 Z(0.0227+$D_{42}$)
N1025  $D_{42}=D_{26}*0.006+D_{27}*0.329+D_{36}*0.012+D_{37}*0.652$
N1030 X.6659 Y4.6319 Z(0.0235+$D_{42}$)
N1035  $D_{42}=D_{26}*0.012+D_{27}*0.298+D_{36}*0.027+D_{37}*0.663$
N1040 X.6614 Y4.6055 Z(0.0240+$D_{42}$)

The weighting values accorded each deviation in line N1015 correspond to the particular X and Y coordinates of line N1020 with respect to the four proximate probe locations defined in this particular example. As can readily be seen, as the X and Y coordinates of the point of interest change, so do the weighting factors accorded each deviation. As previously mentioned, the adaptive postprocessor incorporates the variable deviation for the point of interest $D_{42}$ in the succeeding move command line as a Z axis offset. Also of note is the fact that the weighting factors are normalized values, which is to say that their sum equals unity.

During execution of the move command lines, the Z axis offset value $D_{42}$ is continuously being updated. Since this value is calculated rapidly, it can take place in real time without slowing the machining cycle. For example, while line N1020 is being executed, the look ahead function of the MC2000 calculates the $D_{42}$ deviation of line N1025. This is completed before the X, Y and Z axes have achieved the line N1020 position and their respective axis boards signal the controller that the line N1020 move has been completed. As such, there is no delay in the machining cycle. Look ahead capability is a standard function on most modern machine tool controllers.

As can readily be seen from the algorithm, as the point of interest $P_{42}$ approaches one of the probing points, the weighting values of the other deviations diminish, and in the limit, when the point of interest coincides with a probe point, the value of their deviations are equivalent. For example, when $P_{42}$ is located at $P_{37}$, "a" is equal to "b" and "c" is equal to "d". Substituting these values into equation (1), the first three weighting factors, accorded to $D_{26}$, $D_{27}$ and $D_{36}$, go to zero and the remaining factor is unity, leaving $D_{42}$ equal to $D_{37}$. In this manner, smooth transitions from one rectangle to the next, as well as between the machined area and the forged area external to the machining boundary established by probing sections 28b and 28c are afforded. Machining areas proximate the leading and trailing edges 24 and 26, respectively, which are outside a rectangular region are a simplified case. For example, when near leading edge 24, the contribution of probing locations $P_{21}$ and $P_{31}$ only are used and a single level single axis linear interpolation is performed along the Y axis only, the deviation value being kept constant for any value of X between $P_{21}$ and the leading edge 24. As such, the algorithm simplifies to:

$$D_{42} = \frac{d-c}{d} D_{21} + \frac{c}{d} D_{31} \qquad (2)$$

Figure 6:
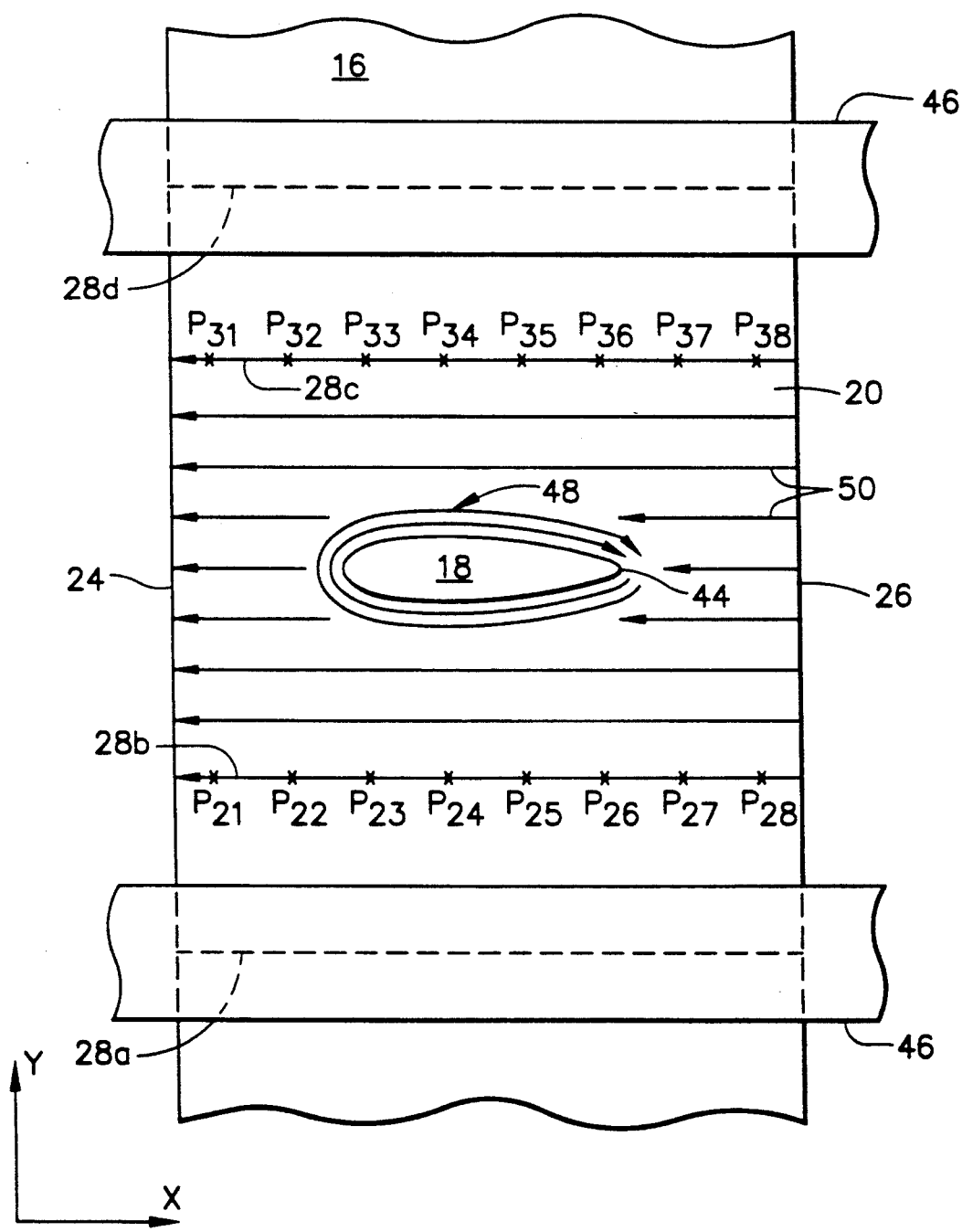
FIG. 6 is a schematic plan view similar to that of FIG. 4 showing the cutter tool paths.

For this particular application, in order to machine the shroud contour 40 and blend it with the pressure face 20, a roughing operation using a ⅜ inch diameter ball mill removes the majority of excess stock. The mill is plunged into the forged protrusion proximate airstream edge 44 and traces a somewhat elliptical pattern 48 as shown in FIG. 6. The side of the mill cuts the shroud contour 40 while the tip of the mill forms the correctly dimensioned blend radius proximate pressure face 20. Consistent with good machining practice, a plurality of nested passes are made starting at approximately 0.060 inch oversize, incrementally approaching shroud contour 40 in 0.010 inch steps. The last pass of the roughing operation leaves approximately a 0.010 inch envelope around contour 40. In the finish machining operation, the contouring feedrate is reduced to minimize any cutting force induced deflection in the ball mill and shroud 18 and the remaining excess stock is carefully removed in a similar manner. After the shroud 18 has been completely machined, a linear machining pattern comprised of a plurality of closely spaced chordal passes 50 are employed throughout the region bounded by longitudinal sections 28b and 28c. In the area of the shroud, milling is interrupted at the blend radius. Since all of the machining move commands incorporate the $D_{42}$ adaptive Z axis deviation, the forged contour at section 28b is gradually linearly blended with that at section 28c with shroud 18 smoothly emerging from the pressure face 20. The additional conventional step of grinding and hardcoating the shroud contact face 52 shown in FIG. 1 completes the processing of the shroud 18.

Since the ball mill leaves a somewhat wavy finish, ball mill tip radius, incremental tool path step size within a single pass, and interpass spacing are determined based on the desired surface finish, as well as the contour of the surface being machined. If transitions are abrupt and a fine surface finish is required, small step size and small interpass spacing are used; however, machining time is increased. In this application, a two square inch area at approximately 30° from normal is machined with a 0.400 inch nominal diameter ball mill. Using a step size of 0.050 inch and spacing of 0.010 inch results in a crest to trough finish height of about 0.0002 inch. If desired, a light buffing operation can be performed to smooth the finish further. The number, location and pattern of probe points is also selected based on the application.

While application of this method does increase the machining cycle, both due to the probing routine as well as the additional machining of pressure face 20 between sections 28b and 28c, a significant reduction both in overall processing time and discrepant hardware have been realized due to the elimination of essentially all of the manual blending previously required.

This method is not limited to the application described. Another example is the machining of the excess forge material between a forged stator vane and its machined platform. In this instance, a tapered ball nose milling cutter could be used to simultaneously mill the airflow side of the platform while blending with the vane airfoil surface. Using a process similar in concept to that of machining near the blade leading and trailing edges, 24 and 26 respectively, a single row of probe hits can be taken on the airfoil generally parallel with and spaced from the platform and utilized in the adaptive NC program to optimally adapt the plurality of mutually parallel linear tool paths using a single level linear interpolation, with deviation values remaining constant in the radial direction between the probe row and the platform edge. Depending on the specific application, use of a bull nose milling tool or other cutter may be desirable. Further, probing patterns other than the single line or fenced rectangle may be used, such as circular, ellipsoidal or various combinations suited to the particular application. Similarly, algorithms other than single level linear and two level dual axis interpolation can be used in the adaptive postprocessor to achieve the desired result. Additionally, multiple axis offsets can be incorporated in each move command. This method also has application to NC machine tools having more than three axes as well as tools which perform other types of machining operations such as grinding and turning. Alternate methods of measuring the workpiece are also contemplated. Spindle mounted laser triangulation devices, for example, or even off machine measurement apparatuses could be employed, as long as the deviation data is communicated to the NC controller. This automatic adaptive sculptured machining technique provides a fast and cost effective method of altering an NC toolpath to match a unique part feature or contour and can be applied to any NC machine tool offering a probing option.

While there have been described herein what are considered to be preferred embodiments of the present invention, other modifications of the invention will be apparent to those skilled in the art from the teaching herein, and it is therefore desired to be secured in the appended claims all such modifications as fall within the true spirit and scope of the invention.

Accordingly, what is desired to be secured by Letters Patent of the United States is the invention as defined and differentiated in the following claims.

We claim:

1. A method of adaptive machining, comprising the steps of:
   a. measuring an actual surface of a workpiece at a plurality of locations relative to a reference nominal workpiece surface defined by a plurality of nominal NC tool paths stored in a NC machine tool controller, said nominal tool paths comprising a plurality of discrete nominal NC move commands;
   b. calculating a spacial deviation between the actual workpiece surface and the nominal workpiece surface for each of said locations;
   c. storing said deviations in said controller; and
   d. concurrently generating modified tool paths in said controller and machining an area of said workpiece with a machining system under numerical control according to said modified tool paths, by sequentially generating and executing a succession of modified move commands for all of said plurality of nominal move commands, using an algorithm which is a function of each of said nominal move commands and at least two deviations, whereby a succeeding modified move command is generated prior to completion of execution of a preceding modified move command by said machining system.

2. The method according to claim 1 wherein said actual workpiece surface is comprised of at least one substantially rectangular area bounded by four measurement locations.

3. The method according to claim 2 wherein said algorithm to modify said nominal tool paths performs a two level dual axis linear interpolation of deviation values at said four measurement locations.

4. The method according to claim 1 wherein said actual workpiece surface is comprised of a substantially rectangular area bounded by two measurement locations and an edge of said actual workpiece.

5. The method according to claim 4 wherein said algorithm to modify said nominal tool paths performs a single level single axis linear interpolation of deviation values at said two measurement locations.

6. A method of adaptively machining an actual surface of a blade, having at least one datum comprising a midspan shroud surface protruding from a forged airfoil surface, automatically blending said shroud surface with said airfoil surface, comprising the steps of:
   a. fixturing said blade by said at least one datum on a table of a numerically controlled machining system in a known location and orientation relative to a geometric coordinate reference system of said machining system;
   b. measuring said airfoil surface relative to said coordinate system at a plurality of colinear locations along a first chord of said blade, wherein said first chord is located between the shroud and a root of said blade;
   c. measuring said airfoil surface relative to said coordinate system at a plurality of colinear locations along a second chord of said blade, wherein said second chord is located between the shroud and a tip of said blade;
   d. calculating a spacial deviation between the actual blade surface and a nominal blade surface relative to said coordinate system for each of said locations, said nominal blade surface defined by a plurality of nominal NC tool paths stored in a NC machine tool controller of said machining system, said nominal tool paths comprising a plurality of discrete nominal NC move commands in said coordinate system;
   e. storing said deviations in a file in said controller; and
   f. concurrently generating modified tool paths in said controller and machining an area of said blade with said machining system between said first and second chords under numerical control according to said modified tool paths, by sequentially generating and executing a succession of modified move commands for all of said plurality of nominal move commands, using an algorithm which is a function of each of said nominal move commands and at least two deviations, whereby a succeeding modified move command is generated prior to completion of execution of a preceding modified move command by said machining system.

7. The method according to claim 6 wherein said algorithm generates a variable axis offset value which is a predetermined weighted function of the at least two measurement location deviation values.

8. The method according to claim 7 wherein said weighted function comprises a single level single axis linear interpolation of deviation values at two measurement locations when machining within an area bounded by said two measurement locations and an edge of said airfoil surface.

9. The method according to claim 7 wherein said weighted function comprises a dual level dual axis linear interpolation of deviation values at four measurement locations when machining within an area bounded by said four measurement locations.

10. The method according to claim 7 wherein:
    said numerically controlled machining system comprises a vertical machining center having two co-planar mutually orthogonal numerically controlled table axes and a mutually orthogonal numerically controlled spindle axis;
    said machining comprises rough and finish milling of said shroud surface and finish milling of said airfoil surface; and
    said variable axis offset value is applied to the spindle axis.

11. The method according to claim 10 wherein said measuring is performed automatically on the vertical machining center under direction of a measurement routine using a spindle mounted touch trigger probe.

12. The method according to claim 10 wherein said measuring is performed remote from the vertical machining center and said deviations are communicated to the controller.

13. A workpiece manufactured according to the method of claim 1.

14. A blade manufactured according to the method of claim 6.

* * * * *